United States Patent [19]

Kimura et al.

[11] Patent Number: 4,855,981

[45] Date of Patent: Aug. 8, 1989

[54] METHOD AND DEVICE FOR READING OUT OPTICALLY RECORDED DATA AND COMPENSATING FOR A DRASTIC CHANGE IN THE POSITION OF A LINE TO BE READ

[75] Inventors: Fumio Kimura; Shunzo Takahashi; Yukio Hamasaki, all of Tokyo, Japan

[73] Assignee: Computer Services Corporation, Tokyo, Japan

[21] Appl. No.: 853,339

[22] Filed: Apr. 17, 1986

[30] Foreign Application Priority Data

Apr. 18, 1985 [JP] Japan .............................. 60-083482
Apr. 22, 1985 [JP] Japan .............................. 60-085697
May 18, 1985 [JP] Japan .............................. 60-106640

[51] Int. Cl.$^4$ ........................ G11B 7/08; G06K 7/10
[52] U.S. Cl. ........................ 369/44; 369/46; 369/47; 235/454; 235/470; 250/202
[58] Field of Search ............... 358/342, 234; 365/234; 369/46, 44, 43, 47, 48, 120, 112, 96, 275; 382/18, 24, 48, 65; 235/454, 436, 474, 456, 470, 463, 471, 461, 462; 250/566, 568, 569, 570, 555, 557, 202

[56] References Cited

U.S. PATENT DOCUMENTS

| | | | |
|---|---|---|---|
| 4,096,992 | 6/1978 | Nojiri et al. | 235/462 |
| 4,189,783 | 2/1980 | Brodie et al. | 358/342 |
| 4,283,777 | 8/1981 | Curry et al. | 365/234 |
| 4,321,622 | 3/1982 | Jerome et al. | 358/342 |
| 4,357,596 | 11/1982 | Feilchenfeld | 235/436 |
| 4,536,866 | 8/1985 | Jerome et al. | 358/342 |
| 4,598,393 | 7/1986 | Pierce et al. | 369/46 |
| 4,634,850 | 1/1987 | Pierce et al. | 235/462 |
| 4,652,730 | 3/1987 | Marshall | 235/436 |
| 4,695,991 | 9/1987 | Hudson | 369/46 |

*Primary Examiner*—Alan Faber
*Assistant Examiner*—Robert A. Weinhardt
*Attorney, Agent, or Firm*—Cushman, Darby & Cushman

[57] ABSTRACT

Method and a device for reading out optically recorded data from an optical recording medium having data recording regions defined by reference lines in stripe and plural data tracks arranged in parallel to each other and perpendicular to said reference lines. According to the present inventions, a drastic change in the position of a reference line at a given order within the sensing field is monitored from among plural reference lines covered by the field. If there is any drastic change, the order of the reference line for reading is modified so that the data track to be read can be accurately followed even if the field of the reading sensor is deviated in the direction of the data tracks. It also enables correct data reading by checking whether the position of the reference lines included in the field of the reading sensor is within the preset tolerance.

10 Claims, 11 Drawing Sheets

METHOD AND DEVICE FOR READING OUT OPTICALLY RECORDED DATA AND COMPENSATING FOR A DRASTIC CHANGE IN THE POSITION OF A LINE TO BE READ

DETAILED DESCRIPTION OF THE INVENTION

[Industrial Application]

This invention relates to a method for reading out data recorded on optical recording media and a device therefor and, more particularly, to a method for reading data recorded on an optical recording medium having data recording regions each of which is defined with reference lines in the form of stripe and having a large number of data tracks parallel to each other and perpendicular to said reference lines on the data recording region.

[Prior Art]

There has recently been developed an optical recording medium to replace conventional magnetic recording media which can be written in with data by utilizing changes in optical patterns; e.g. the pattern of lightness corresponding to digital data which should be written. This type of media can be roughly classified into discs and cards or sheets. Among them optical memory cards attract much attention as a card-type memory element of a large capacity which can replace magnetic cards.

FIGS. 10 through 12 show the structure of a card-type medium which typifies such optical recording media. The optical recording medium shown in the figures comprises an optical recording medium 2 laminated in layer on a card-type substrate 1, reference lines 7 provided on said medium 2 in parallel to each other, and data recording regions 3 held between adjacent reference lines 7.

The data recording regions 3 are provided generally in plural and a large number of tracks 4 are provided thereon transversely at a given interval to form data trains. Each track 4 is provided with memory cells 5 inside. One or several memory cell(s) record(s) one bit of digital data.

The optical recording medium of this type is further provided at one end of the regions 3 in the direction of tracks with a starting end reference line 6 and with a reference bus 8 in the form of a letter T in relation to the reference line 6 which divides plural data recording regions into two groups. There may be a data recording region 3 without such starting end reference line 6 and the bus 8.

In the reading out operation of data from such optical recording media, data which are recorded in the light-and-dark pattern on the medium are read out in the unit of one track with a reading sensor such as a CCD linear sensor having a linear or area sensing field of the length slightly longer than the width of a data recording region and of the width at least covering one track. It is therefore necessary to relatively move the optical recording medium and the reading sensor so that the reading sensor should be precisely positioned to oppose in parallel to a track from which data is being read out. In other words, the reading sensor should precisely follow the data trains on the data recording regions.

In the prior art systems, the position of such a reading sensor is generally controlled by detecting a positional deviation or inclination of a card with a sensor such as a limit switch and controlling a servo system with a detection signal to correct the position.

[Problems to be Solved by This Invention]

Unlike magnetic cards, minute memory cells on the above optical recording medium are packed at a high density at intervals of several microns to several tens microns. Even a slight deviation or inclination of the reading sensor from the track of data will cause a grave consequence, often incapacitating precise reading of data.

It is, however, extremely difficult to precisely detect minute deviation or inclination relative to an optical recording medium with conventionally available control technology. Such sophisticated detection may not be absolutely impossible technologically, but it requires a sensor of super high precision additionally and forms an unfavorable cost pushing factor.

This invention was conceived to solve such problems encountered in the prior art and aims at providing a method and a device for reading out optically recorded data precisely from a data track on a data recording region without requiring an additional sensor of super high precision but by using a reading sensor also as a sensor to detect a positional deviation or an inclination and therefore without pushing up manufacturing cost of the reading device.

[Summary of the Invention]

This invention relates to a method for reading out optically recorded data and a optically recorded data reading out device. The application discloses plural inventions which are closely related to each other.

The first invention of this application relates to a method for reading out optically recorded data from an optical recording medium provided with data recording regions defined by reference lines in stripe and with a plurality of data tracks on said data recording regions perpendicular to said reference lines, comprising steps of;

sequentially reading out data from a starting end with a reading sensor having the sensing field covering plural data tracks including the data track which is being read out and the reference lines interposed therebetween, extracting signals from output signals of said reading sensor which correspond optically with said reference lines to sequentially detect the reference lines, and when detecting the reference line which is positioned at a preset order in the sensing field, reading out the data from the track on the data recording region defined with said reference line as proper data.

The second invention of this application relates to an optically recorded data reading device which reads out data from an optical recording medium provided with data recording regions defined by reference lines in stripe and with a plurality of data tracks perpendicular to said reference lines on said data recording regions, comprising a reading means which sequentially reads data from a starting end with a reading sensor having a sensing field covering plural data tracks including the data track being read out and reference lines interposed therebetween, a reference line detecting means which extracts signals from the output signals of said reading means which correspond optically with said reference lines and sequentially detects the reference lines to output a reference line detection signal, and a reading position indication means which counts said reference line detection signal, and when detecting a reference line among said reference line detection signals and in said sensing field which is positioned at a preset order, indicates the position of the data from the track of the data recording regions defined by said reference lines.

The third invention of this application relates to an optically recorded data reading device which reads out data from an optical recording medium provided with data recording regions defined by reference lines in stripe and with a plurality of data tracks on said data recording regions perpendicular to said reference lines, comprising a reading out means which sequentially reads out data from a starting end with a reading sensor having a sensing field covering data track to be read out and reference lines on both sides thereof, and a reference line detection means which extracts signals from the output signals of said reading means which optically correspond with said reference lines for sequential scanning and outputs the reference line detection signal, said reference line detection means comprising a signal level discriminating means which extracts from said output signals of the reading sensor the signal of the level optically corresponding to said reference lines, a duration counting means which counts the time period during which said extracted signal continues, and a decision means which compares the above time counted by said duration counting means with a preset reference level to find out whether or not the counted value reaches the preset level, and if so, outputs a reference line detection signal.

[Effect]

The reading sensor in the first and second invention structures sequentially reads out data from a starting end covering in one scope of sensing field plural data tracks including the particular track being read and reference lines defining the track from both sides. Data reading from the optical recording medium is possible for one or several data recording regions covered by the sensing field. In reading, not only target data recording regions but the whole scope from the starting end to the other end are scanned track by track. The reading field is relatively moved to an adjacent track after one track has been scanned.

In the first and second inventions, the data on the target region alone is extracted from all of the data read out in above scanning by detecting the reference lines which define the target region. More particularly, when particular reference lines which position at a preset order are detected in said sensing field, the data from the track defined by these lines is recognized and read as a proper data.

With such arrangement, even if the field F is vertically deviated, the data can be read out from the aimed data track so long as the particular data track is held within the field.

In the structure disclosed in the third invention of this application, the sensor can read out data from one to several tracks at one time. Reference lines are read out simultaneously with said sensor.

The read out data are sent to a signal level discriminating means, and signals of the level optically corresponding to the reference lines (e.g. low level) are taken out.

Time duration counting means counts the duration of time the level continues for the extracted signal. The decision means compares the values counted by the time duration counting means with a preset reference value and when the value reaches the reference level, outputs a reference level detection signal.

According to the third invention of this application, the reference lines can be detected from the outputs of the reading sensor and data are read out referring to this reference lines.

By detecting the position of said reference lines from the output signals of the reading sensor, it becomes possible to detect whether or not the sensor holds the data recording regions correctly in the field thereof. In other words, it is possible to detect whether or not the reading sensor is deviated from the data recording regions. It also becomes possible to detect data recording regions which are not perpendicular to the reading sensor (in other words, when the reading sensor is inclined with respect to the track). When the position of the reference lines within the field changes along with the movement of the reading sensor to deviate from a tolerance, such deviation or inclination can be detected.

[Preferred Embodiments]

Figure 1:
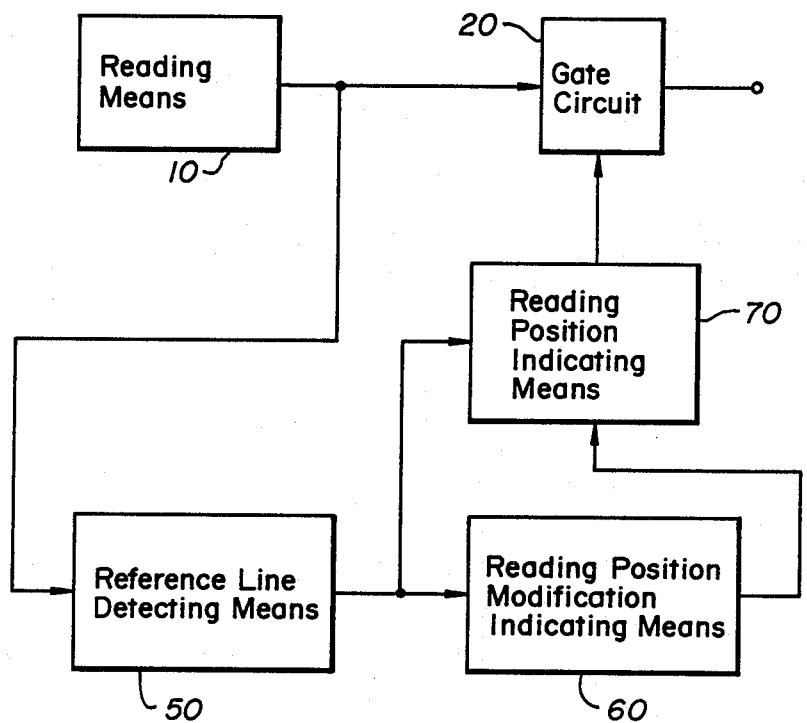
FIG. 1 is a block diagram to show the outline of the structure of the first embodiment of the optically recorded data reading device according to this invention.

This invention will now be described referring to preferred embodiments shown in the drawings.

(Structure of the First Embodiment)

Figure 3:
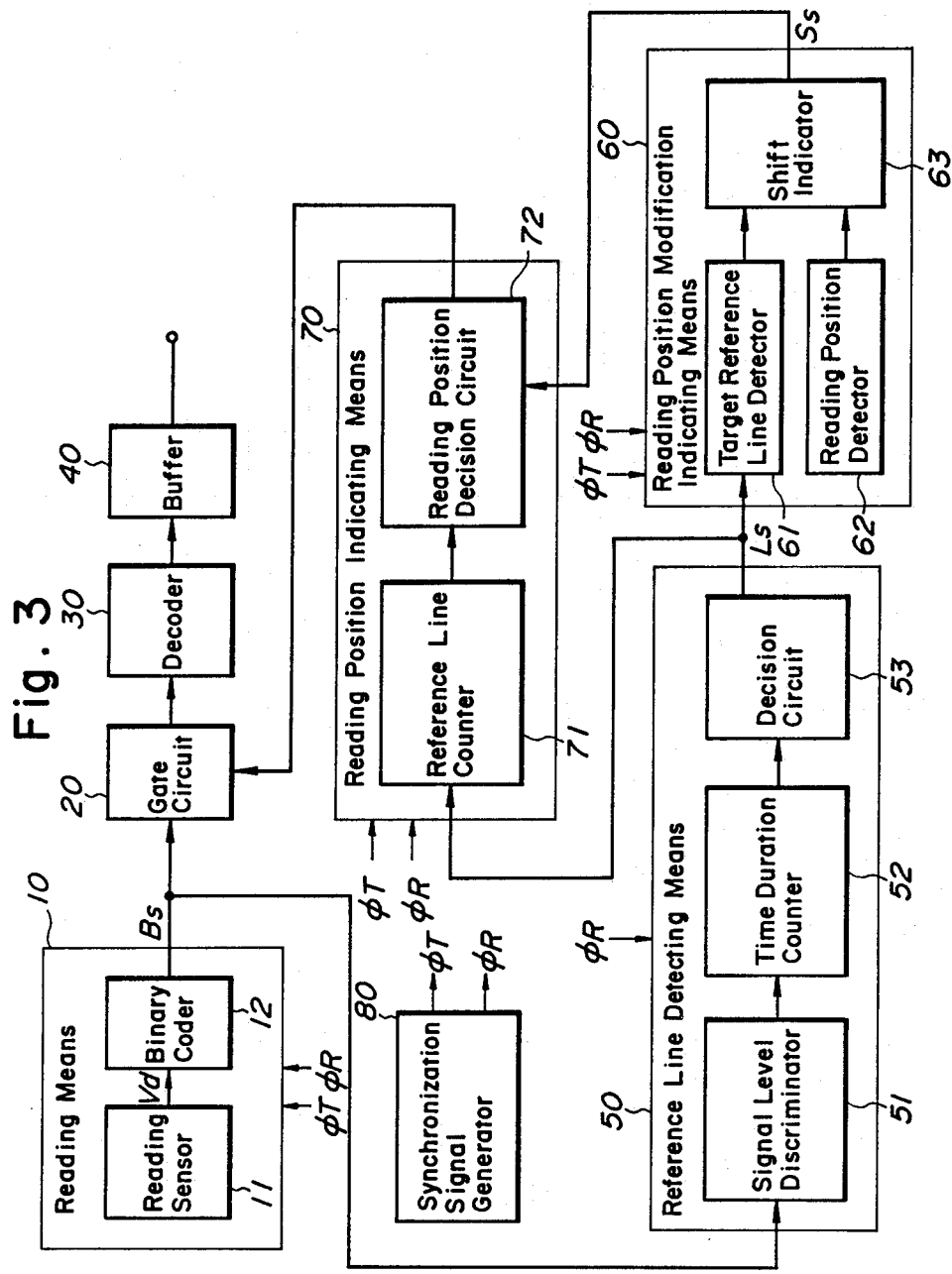
FIG. 3 is a block diagram of the structure of the first embodiment of the optically recorded data reading device in more detail.

FIGS. 1 and 3 show the structure of the first embodiment of the optically recorded data reading device. The device for reading optically recorded data shown in the figures is the second embodiment of this invention as well as a device with which the method for reading optically recorded data according to the first invention is conducted.

The device for reading out optically recorded data illustrated in the figures is a device which reads out data from an optical recording medium provided with data recording regions defined by reference lines in stripe and with a large number of data tracks perpendicular to said data recording regions. The device comprises a reading means 10, a gate circuit 20, a reference line detecting means 50, a reading position modification indicating means 60, a reading position indicating means 70, and a synchronizing signal generator 80, and further includes a decoder 30 which decodes read out signals, and a buffer 40 which holds decoded signals.

The reading means 10 comprises a reading sensor 11 having a sensing field covering plural data tracks including the particular data track which should be read and reference lines defining the tracks which reads data from an end of the field and outputs video signals thereof, and a binary coder 12 which codes the video signals from the sensor 11 into binary signals Bs and outputs the same.

Figure 2:
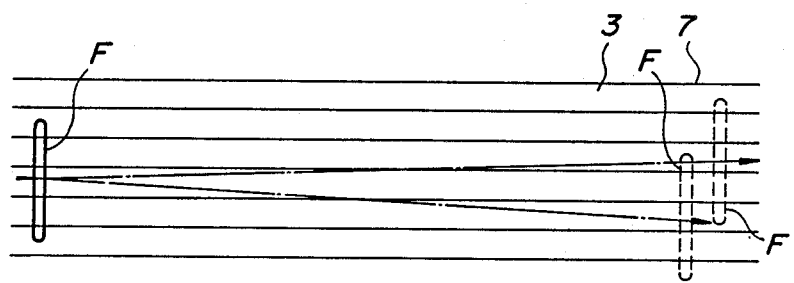
FIG. 2 is an explanatory view to show the relation between the field F of the reading sensor and data recording regions.

The reading sensor 11 may be a CCD linear sensor and as shown in FIG. 2, is provided with photodetectors forming a field F which is longer than ca. four recording regions of an optical recording medium. The photodetectors are provided in the number ca. four times the number of memory cells in one track, for instance, 2048 elements in this embodiment, and arranged at an interval corresponding to that of the cells.

The reading sensor 11 reads data by accumulating electric charges in proportion to the amount of light received by each photodetector, and serially outputting the charges in accordance with synchronizing signals $\phi R$ which will be described hereinafter. The output thereof becomes video signals Vd for each track.

The binary coder 12 may be a comparator which compares said video signals Vd with a reference value and codes the same into binary signals Bs.

The gate circuit 20 may be an AND gate which controls transmission of the output signals of said reading means 10.

Figure 4:
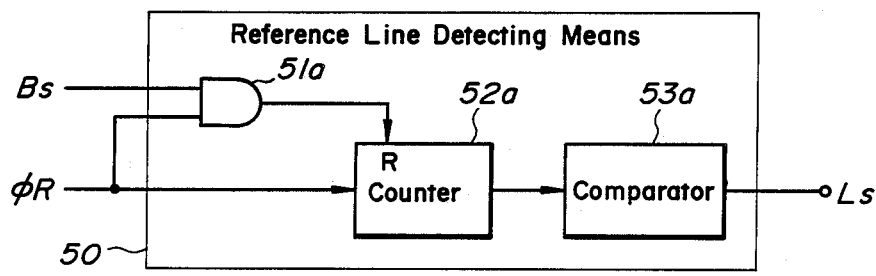
FIG. 4 is a block diagram to show the structure of a reference line detection means which is one component of said embodiment.

Said reference line detecting means 50 comprises a signal level discriminator 51 which takes out signals of a predetermined output level corresponding to the reference line from the binary signals Bs, a time duration counter 52 which counts the duration of the taken out signal, and a decision circuit 53 which monitors whether or not said duration exceeds a predetermined value and if so, outputs reference line detection signals Ls. FIG. 4 shows an embodiment of the structure of the reference line detecting means 50.

In FIG. 4, the signal level discriminator 51 may be an AND gate 51a which receives as inputs said synchronizing signals $\phi R$ and inverted binary signals Bs. The time duration counter 52 may be a counter 52a which counts synchronizing signals $\phi R$. The counter 52a is reset with high level signals from the AND gate 51a. The decision circuit 53 may be a comparator 53a which compares the counted value from the counter 52a with a predetermined reference value and if the counted value exceeds the reference value, outputs reference line detection signals Ls.

Figure 5:
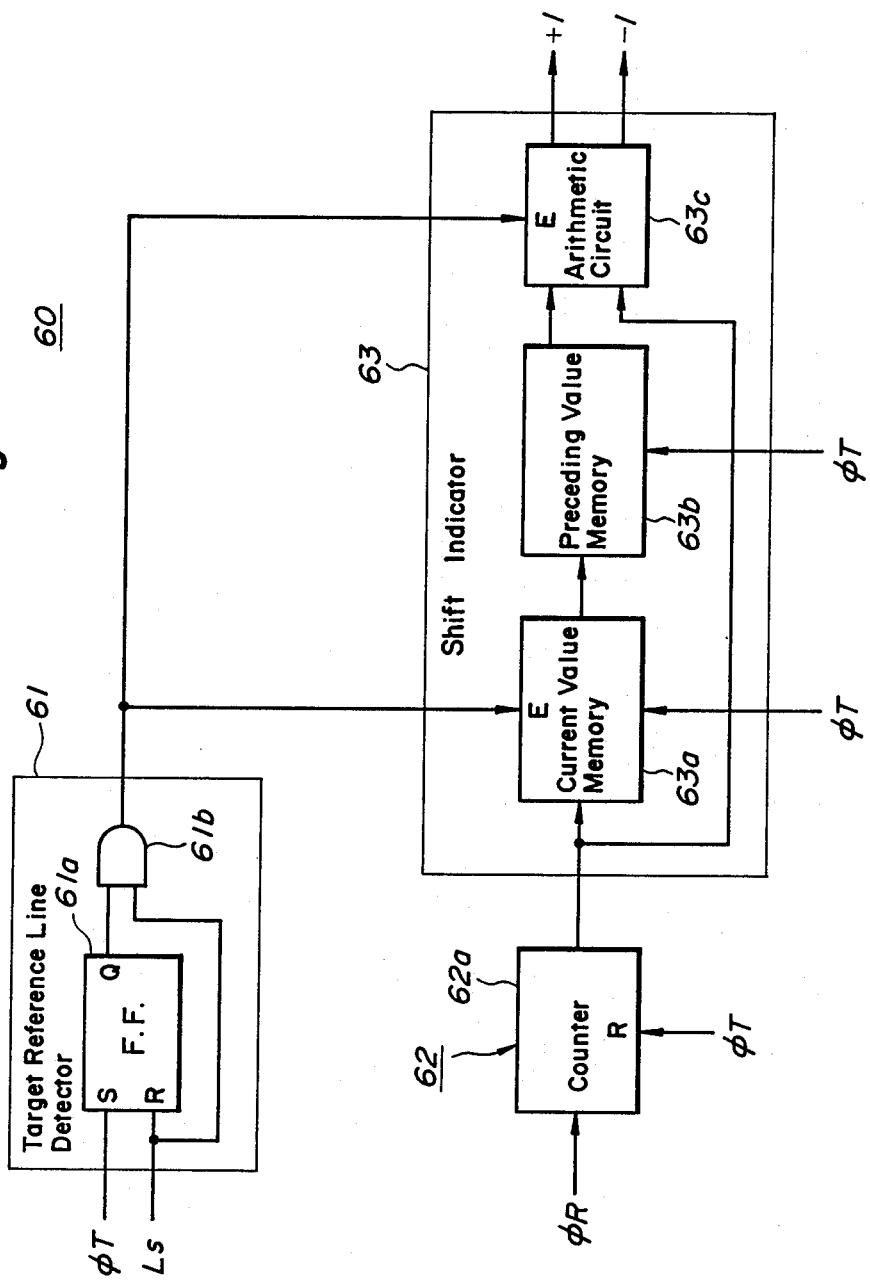
FIG. 5 is a block diagram of the structure of a reading position change indicating means which is a component of said embodiment.

The reading position modification indicating means 60 comprises a target reference line detection circuit 61 which detects the first reference line which comes in the field out of said reference line detection signals Ls, a reading position detecting circuit 62 which detects the position of the data which is being scanned with said reading sensor 11 within the field, and a shift indicator 63 which compares the position of the first reference line detected by the target reference detection circuit 61 with the reading position at the preceding scanning, monitors whether or not there is any drastic change between said two, and if there is a drastic change, outputs a shift command Ss which directs a shift of the reading position in accordance with the direction of such a change. FIG. 5 shows the structure of the reading position modification indicator 60.

As shown in FIG. 5, the target reference line detector comprises a flip-flop 61a and an AND gate 61b. The flip-flop 61a inputs synchronizing signal $\phi T$ at a set terminal S for giving a starting timing for each scanning, inputs the reference line detection signals Ls at a reset terminal R, and connects the Q output therefrom with the input of the AND gate 61b. The AND gate 61b receives as input the reference line detection signals Ls.

The reading position detector 62 may be a counter 62a which is reset with synchronizing signals $\phi T$ and counts synchronizing signals $\phi R$.

The shift indicator 63 may comprise a current value memory 63a, a preceding value memory 63b and an arithmetic circuit 63c. The memories may be registers. The outputs from the AND gate 61b are inputted at the enabling terminals E of the current value memory 63a and of the arithmetic circuit 63c and when said outputs are at high level, data are taken in.

The current value memory 63a and the preceding value memory 63b are so constructed that the contents of the memory 63a will be transferred to the memory 63b by means of synchronizing signals $\phi T$. The arithmetic circuit 63c has an arthmetic function as well as a decision function and is connected at the input thereof with the counter 62a and the preceding value memory 63b. The arithmetic circuit 63c obtains the difference therebetween and if the difference becomes remarkably large, outputs either +1 or −1 as a shift command Ss in correspondence with the sign of the difference.

Figure 6:
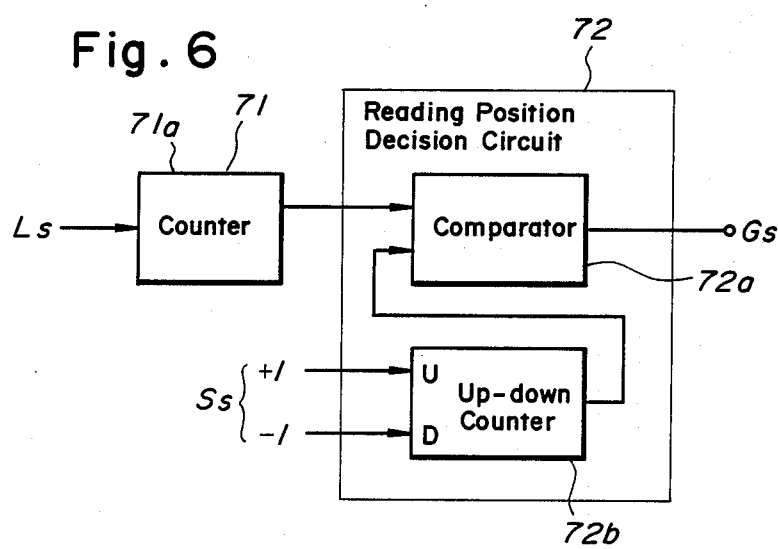
FIG. 6 is a block diagram of a reading position indicating means which is a component of said embodiment.
Figure 7:
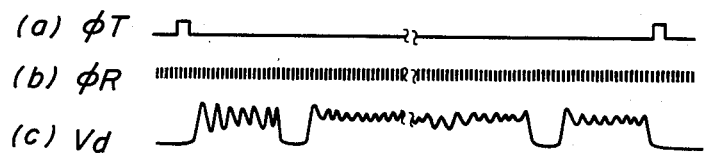
FIGS. 7(a)–(c) show waveforms of video signals from the reading sensor and synchronizing signals.

The reading position indicating means 70 comprises a reference line counter 71 which counts the signals Ls in order to detect the reference lines defining the particular data recording region to be read out, and a reading position decision circuit 72 which decides the position of the data recording region which should be read out on the basis of the counted values from the reference line counter 71 and the shift command Ss. FIG. 6 shows an example of the structure of the reading position decision circuit 72.

The reference line counter 71 may be a counter 71a which counts the reference line detection signals Ls.

The reading position decision circuit 72 comprises a comparator 72a which compares the counted value from the counter 71a with a target value to determine the position of the data recording region which should be read and outputs gate signals Gs, and an up-down counter 72b which has a function for presetting the target value as well as an up-down function to modify said target value with shift commands Ss.

The synchronizing signal generator 80 outputs synchronizing signals $\phi R$ as a reset pulse for transferring the electric charges accumulated in photodetectors and synchronizing signals $\phi T$ which synchronizes start of transfer for each track to the reading sensor, and outputs synchronizing signals to a driving controller (not shown) for the start of relative movement between the reading sensor and the recording medium. The synchronizing signal $\phi R$ in this embodiment is outputted in the number of pulses corresponding to the number of elements of the reading sensor 11 between the two synchronizing signals $\phi T$ and $\phi T$.

(Operation of the First Embodiment)

The operation of the first embodiment having the aforementioned structure will now be described referring to said figures and FIGS. 7 through 9B. It is assumed in this embodiment that the reference lines on the optical recording medium is set to keep the state with low reflectance. Therefore, the portion of the video signals read by the sensor which keeps low outputs level corresponds with the reference line.

For facilitating discrimination of reference lines, data should be coded by FM encoding. In FIM encoding, "1" which is a digital data of one bit is represented by two bits of "0, 1" or "1, 0" while "0" is represented by "0, 0" or "1, 1". If the reference line 7 is formed to continue a low level (or high level) for a certain period of time, it can be easily discriminated from data.

The following operation will be performed in order to read data from an optical recording medium. A reading sensor is carried by a moving controller (not shown) to oppose to the track on the recording region which should be read. At this position, the synchronizing signal generator 80 issues synchronizing signals $\phi T$ as shown in FIG. 7a to start the reading operation of the sensor 11. With the synchronizing signal $\phi R$ (see FIG. 7b) from the synchronizing signal generator 80, the reading sensor 11 transfers in serial the electric charges accumulated in each photodetector and outputs video signals Vd as shown in FIG. 7c. These video signals Vd are sent to a binary coder 12 to be encoded into binary signals.

When the reading sensor has completed reading one track data, it is moved by the moving controller to the next track to read the data therefrom by repeating the same operation.

Explanation will now be given to the effect unique to this embodiment.

Figure 8A:
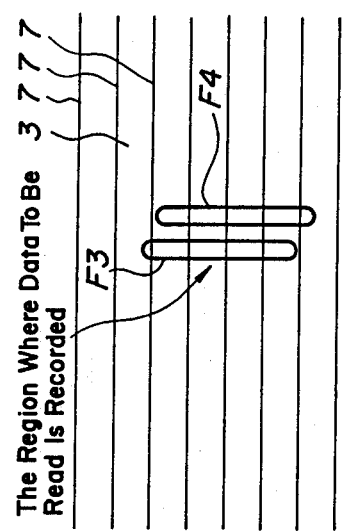
FIGS. 8A and 8B are explanatory views to show the relation between the field F of the reading sensor and data recording regions.
Figure 8B:
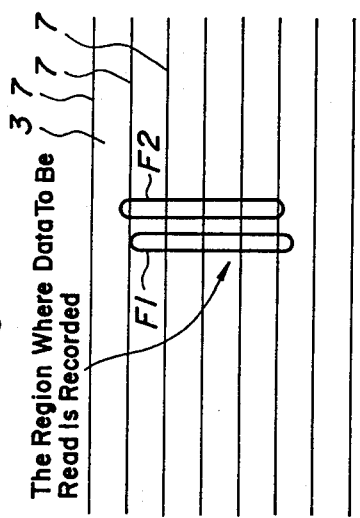

The reading sensor 11 moves along the data recording region on the medium C to read data track by track. The scope of the sensing field which the sensor can hold simultaneously is limited to several regions, and may be as wide as four regions in this embodiment as shown in FIGS. 8A and 8B. The standard position herein is the position which covers four reference lines 7 within the field F.

The binary signals Bs are sent to the gate 20 and the reference line detecting means 50. Only when the gate is open, the signal Bs can be sent to the decoder 30.

At the reference line detecting means 50, the synchronizing signals $\phi R$ are counted by the counter 52a and the counted value is sent to the comparator 53a. At the AND gate 51a, the binary signals Bs are sampled using the synchronizing signal $\phi R$ as a gate signal. When both synchronizing signal $\phi R$ and the binary signal Bs are at high level, the output from the AND gate 51a becomes high level. Consequently, the counter 52a is reset.

The counter 52a has been counting the synchronizing signals $\phi R$ and everytime it is reset, it starts counting anew. Therefore, when the output in binary signals Bs keeps low level for a long time, the values counted by the counter 52a are accumulated, but as the counter is otherwise reset at a short interval, the counted values would not be accumulated for a long time.

The comparator 53a compares the counted values by the counter 52a with a preset time length. When the counted value reaches the preset value, the comparator 53a outputs reference line detection signals Ls.

The reference line detection signals Ls are sent to the reading position modification indicating means 60 and the reading position indicating means 70.

At the reading position modification indicating means 60 the signals are inputted at the flip-flop 61a which acts as the target reference line detecting means and the AND gate 61b.

The flip-flop 61a is reset with the synchronizing signal $\phi T$ to make the output terminal Q high level and is reset with the reference line detection signals Ls to make the output terminal Q low level. The synchronizing signal $\phi T$ is outputted at the start of each scanning, and the flip-flop 61a is therefore set at every scanning. It is reset with the input of the reference line detection signals Lc.

The output of AND gate 61 becomes higher in level only when the above output terminal Q becomes high level and the above reference line detection signals Ls are inputted. This means that the output of the target reference line detector 61 becomes high level only when the reference line detection signal Ls for the first reference line coming into the field is inputted. This output is an enabling signal to the current value memory 63a and the arithmetic circuit 63c which will be described hereinafter. When these outputs become high level, the current value memory 63a and the arithmetic circuit 63c are enabled to take in data.

At the reading position modification indicating means 60, the counter 62a has been counting synchronizing signals $\phi R$. The counter is reset everytime synchronizing signal $\phi T$ is inputted to start counting anew. The counted values are taken in by the current value memory 64a and the arithmetic circuit 63c of the shift indicator 63. The value counted by the current value memory 64a is transferred to the preceding value memory 63b in synchronization with synchronizing signals $\phi T$. The counted values stored at the preceding value memory 63b are taken in by the arithmetic circuit 63c with enabling signals from the AND gate 61b.

The arithmetic circuit 63c compares said counted value from the counter 62a with the counted values stored in the preceding value memory 63b, and if there is a drastic change in the difference, outputs signals of either +1 or −1 depending on the sign of the difference as shift command signals Ss. It does not issue any signals if there is no such drastic change in the difference.

At the reading position indicating means 70, the counter 71a counts the reference line detection signals Ls and the comparator 72a compares the counted values with the target value to detect the data recording region which should be read out.

The target value is preset by the preset function of the up-down counter 72b. For example, in order to read out the data recording region sandwiched between the second and the third lines from the top of the field as shown by F 1 in FIG. 8A, the up-down counter 72b is preset with [2]. If it is desired to read out the data recording region sandwiched between the third and the fourth lines from the top of the field as shown in FIG. 8B by F 3, on the other hand, the up-down counter 72b is preset with [3].

Figure 9A:
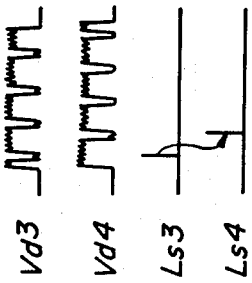
FIGS. 9A and 9B show waveforms to indicate the relation between the video signals from reading sensor and the reference line detection signals respectively.

The reading sensor 11 outputs video signals Vd as shown in FIG. 9A by Vd 1. At the reference line detecting means 50, the reference line detection signals as shown .. by Ls 1 in FIG. 9A is outputted as the first signal of the current field.

At the reading position indicating means 70, the counter 71a counts the reference line detection signals Ls and if the counted values reaches the target [2]preset at the up-down counter 72b, the comparator 72a starts outputting the gate signals.

On receiving the gate signals, the gate 20 opens Consequently, the binary code signals Bs outputted from the reading means 10 are sent to the decoder 30 to be decoded and the decoded contents thereof are stored at the buffer 40.

Subsequently, the reading sensor 11 is moved in relation to the longitudinal direction of the data recording regions to read the data from adjacent data track. In this manner, the sensor 11 can read out data sequentially from adjacent tracks.

Although the reading sensor 11 should be precisely opposed in parallel to data tracks, perfect parallel relation is difficult to maintain in practice. They often oppose to each other at a slight angle on two parallel planes. Such an angular deviation may displace the sensing field of the reading sensor 11 toward the direction of data tracks as it is moved relatively in the longitudinal direction thereof even though such deviation may be quite negligible for data reading.

When such displacement becomes so great that the field is deviated by one reference line, the data recording region is also deviated. The displacement is monitored by the reading position modification indicating means 60 according to this invention.

The reading position modification indicating means 60 detects the reference lines which are the target of the monitoring (in this embodiment the reference line coming first in the field F) from the signals Ls by means of the target reference line detector 61 comprising the flip-flop 61a and the AND gate 62b. Simultaneously the counter 62a is reset with synchronizing signal $\phi T$ to count synchronizing signals $\phi R$ for each scanning. When the target reference line detector 61 detects the reference line, the counted values are inputted at the current value memory 63a and the arithmetic circuit 63b of the shift indicator 63. The values thus stored at the memory are transferred to the preceding value memory 63b in synchronization with the next synchronizing signal $\phi T$.

The arithmetic circuit 63c is enabled with enabling signals which are issued when the target reference line detector 61 detects the target reference line, compares the counted values at the preceding scanning from the preceding value memory 63b with the counted values at the current scanning from the current value memory 62a to obtain the difference therebetween. If the difference is small, it does not output any signals when the difference is remarkably large, it outputs a shift command with a sign corresponding to that of the difference.

For instance, if the video signal is like the one shown by Vd 1 in FIG. 9A at the preceding scanning, and like the one shown by Vd 2 in FIG. 9A at the current scanning, the detection position of the reference line detection signal Ls becomes as shown by Ls 1 in FIG. 9A at the preceding scanning and like the one shown by Ls 2 in FIG. 9A at the current scanning, indicating a remarkable change. This drastic change is caused by the fact that as shown in FIG. 8A, the field F of the reading sensor 11 is deviated upward as the field F2 and the reference line which was not included in the field F1 at the preceding scanning newly appears at the starting end of the field F2. Therefore, the arithmetic circuit 63c outputs a shift command Ss to count up the target value by +1.

Figure 9B:
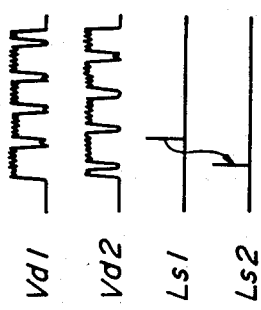
Figure 10:
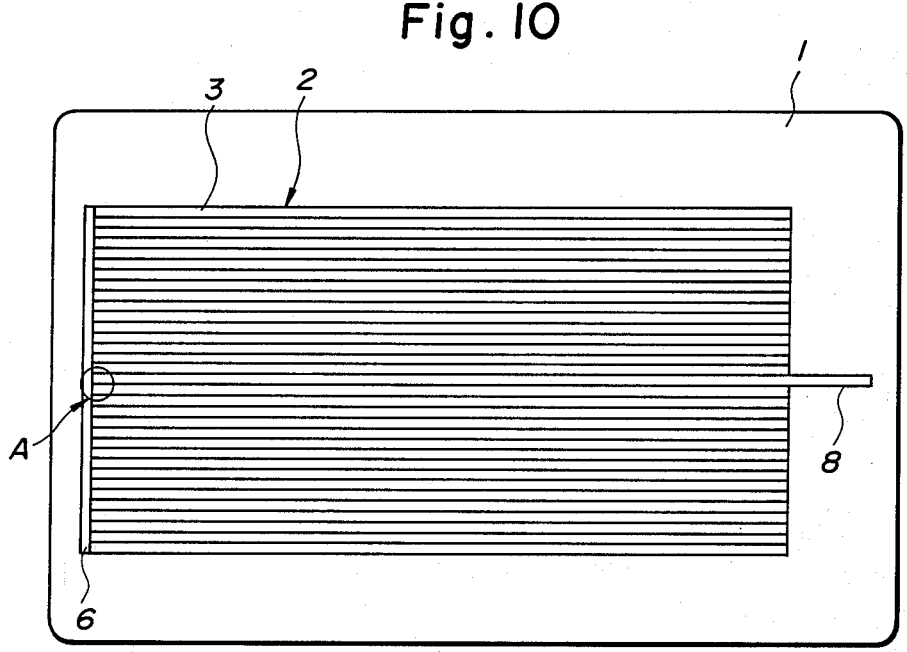
FIG. 10 is a plane view to show an example of optical recording medium which can be used for this invention.
Figure 11:
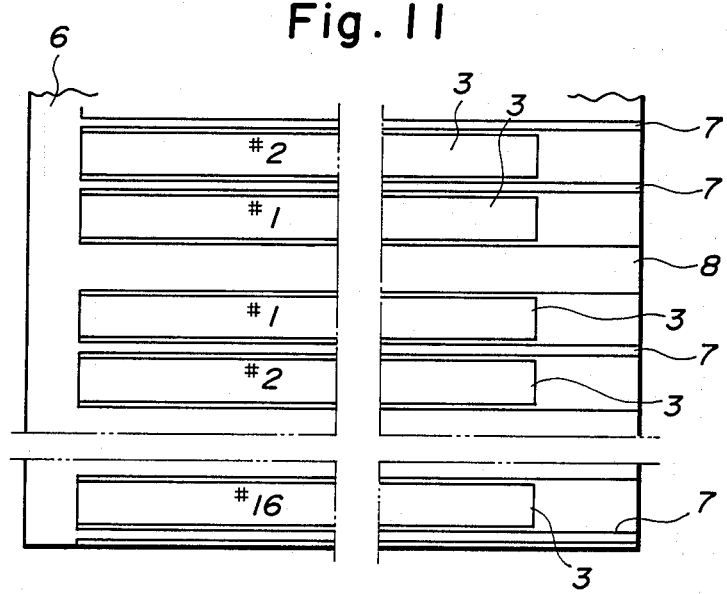
FIG. 11 is a partially enlarged view in section of a card or the medium shown in FIG. 10.

On the other hand, if the video signal is like the one as shown by Vd 3 in FIG. 9B at the preceding scanning and like the one shown by Vd 4 in FIG. 9B, the detection position of the reference line detection signal Ls becomes like the one shown by Ls 3 at the preceding scanning and like the one shown by Ls 4 in FIG. 9B at the current scanning, indicating a drastic change. This is caused by the fact that as shown in FIG. 8B, the field F3 of the reading sensor 11 is deviated downward into the field F4 in the figure and the reference line which was included in the field F3 at the preceding scanning disappears from the starting end of the field F4 at the current scanning. Therefore, the arithmetic circuit 63c outputs a shift command of −1 to count down the target value.

At the reading position indicating means 70, the counter 71a counts the reference line detection signals Ls and sends the counted values to the comparator 72b. The up-down counter 72b increases/decreases by one the preset target value with a shift command Ss. For instance, if the preset target value is [2]and if the sensor is deviated as shown in FIG. 8A by F2, the target value is modified into [3]and when the counter 71a has counted 3 reference lines, the comparator 72a outputs a gate signal Gs. When the preset target value is [3]and the sensor is deviated as shown in FIG. 8B by F4, the target value is modified into [2]and when the counter 71a has counted 2 reference lines, the comparator 72a outputs a gate signal Gs.

When a gate signal Gs is outputted in this manner, the gate 20 is opened to allow the binary code signals Bs form the reading means 10 to be inputted at the decoder 30. When the next reference line is detected, the number of reference lines counted exceeds the target value, so that the comparator 72a stops outputting the gate signals. This makes the decoder 30 to receive selectively the track data of the targeted recording regions.

According to this embodiment as described in the foregoing, so long as the data track which should be read is held within the sensing field, even if the field F is slightly deviated vertically, data can be read out from the targeted data track.

This invention also enables data to be read out precisely from the aimed data track even if the reading sensor is relatively moved in the longitudinal direction of data recording regions with its sensing field inclined at an angle against the regions such that the field F is deviated vertically from the regions.

(Structure of the Second Embodiment)

Figure 13:
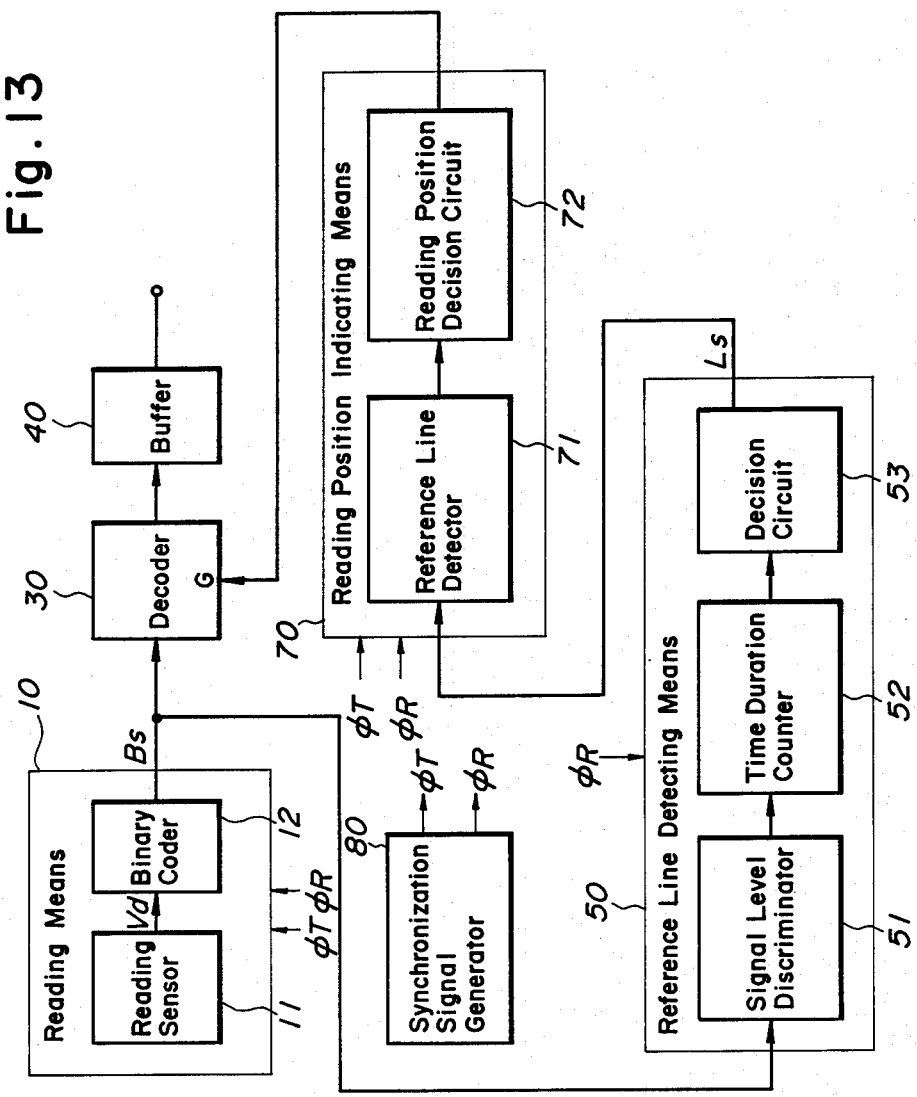
FIG. 13 is a block diagram to show the structure of the second embodiment of the optically recorded data reading device according to the invention.

FIG. 13 shows the structure of the second embodiment of the optically recorded data reading device.

The device for reading optically recorded data shown in the figure comprises a reading means 10 which includes a reading sensor and a binary coder, a reference line detecting means 50 which includes a signal level discriminator 51, a time duration counter 52 and a decision circuit 53, a reading position indicating means 70 which includes a reference line counter 71 and a reading position decision circuit 72, and a synchronizing signal generator 80, and is further provided with a decoder 30 for decoding read out signals and a buffer 40 for holding the decoded signals. This embodiment is substantially the same as the first embodiment in structure except that the gate circuit 20 and the reading position modification indicating means 60 are not included in the second embodiment and that the reading position indicating means 70 and the decoder 30 respectively differ structure wise from the first embodiment. The second embodiment will now be described focusing mainly on these differences.

Although no independent gate circuit is provided, the decoder 30 having a gate function at input is used.

As this embodiment does not include the reading position modification indicating means 60, the reading position indicating means 70 is correspondingly simplified in structure.

Figure 14:
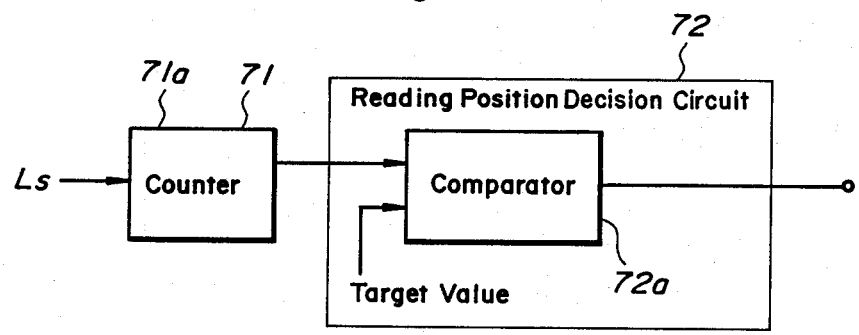
FIG. 14 is a block diagram to show the structure of a reading position indicating means which is a component of said embodiment.

As shown in FIG. 14, the reading position indicating means 70 is provided with a counter 71a as the reference line counter 71 which counts reference lines out of reference line detection signals Ls so as to detect the reference lines defining a particular data reading region. A comparator 72a is also provided to act as the reading position decision circuit 72 to decide the position of the data recording region by comparing the counted values from the counter 71 with the preset target value.

The counter 71a and the comparator 72a are identical to those used in the first embodiment, but the up-down counter for setting the target value is not provided. The target value is determined by the sequential order of the reference lines which define the data recording regions appearing in the field. Unlike the first embodiment, the target value in this embodiment is fixed and is therefore preset at the comparator 72a. The target value may be variable. In that case, a digital switch, register and the like may be used as the target value setting means.

(Operation of the Second Embodiment)

The operation of the second embodiment having the above structure will now be described referring to the figures mentioned. The operation is essentially the same as that of the first embodiment except for the modification of the reading position which is not included in this embodiment. The reading position decision circuit 72 will therefore be described in detail as the operational differences lie there.

The data read by the reading means 10 are encoded into binary signals Bs and sent to the decoder 30 and the reference line detecting circuit 50. The binary signal Bs can be inputted at the decoder 30 only when an input enabling signal is transmitted from the reading position decision circuit 72. At the reference line detecting circuit 50, on the other hand, the reference lines are detected from the binary signals Bs and outputted as the reference line detection signals Ls.

The reference line detection signals Ls are counted by the counter 71a, and the counted value is sent to the comparator 72a. The comparator 72a compares the counted value with the target value, and when the counted value remains identical with the target value, outputs input enabling signals (the signal may be a gate signal Gs as in the first embodiment) to the decoder 30.

The target data are selectively inputted at the decoder 30 in this manner.

(Structure of the Third Embodiment)

Figure 15:
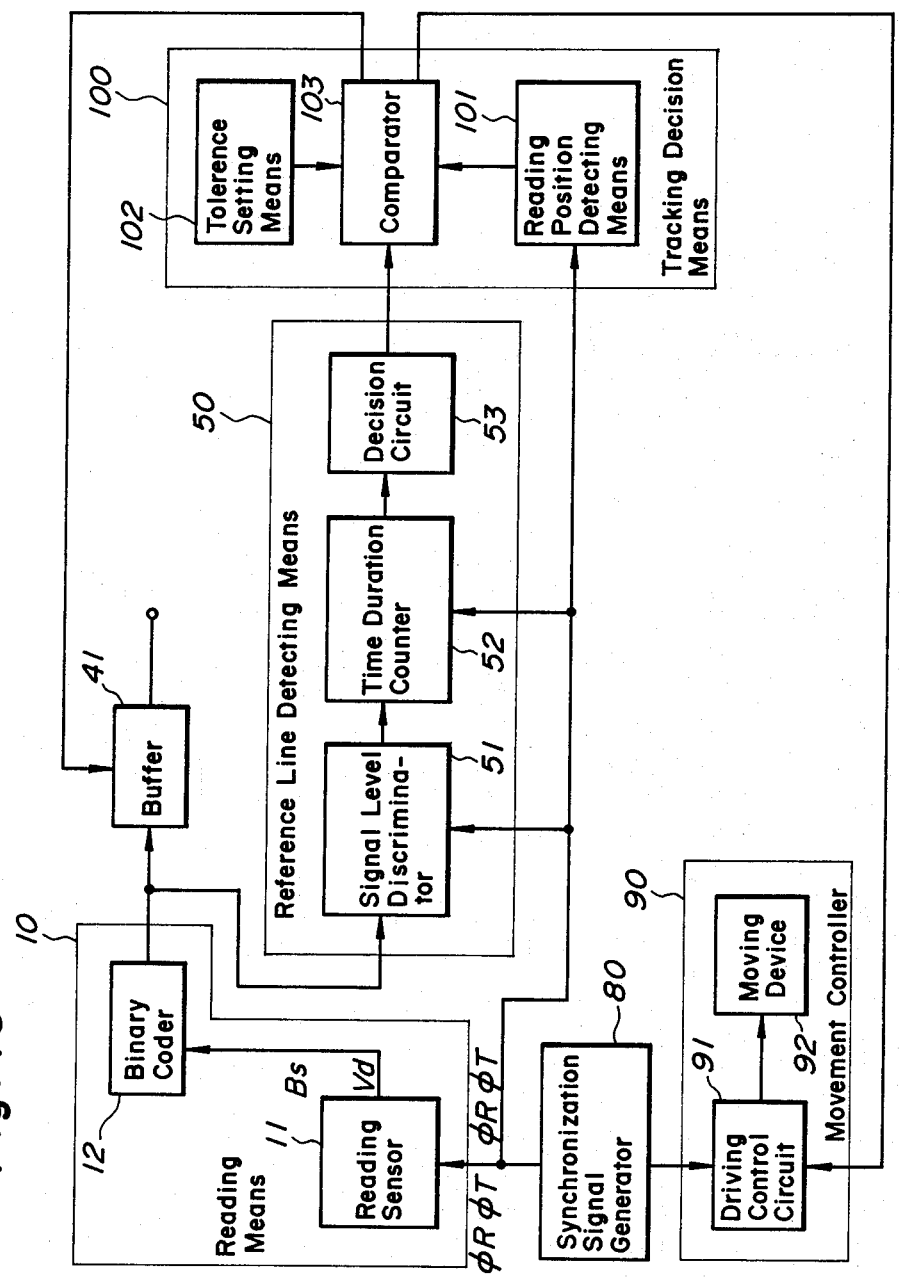
FIG. 15 is a block diagram to show the structure of the third embodiment of this invention.

FIG. 15 shows a schematic view of the structure of the third embodiment according to the present invention.

The optically recorded data reading device to which the third embodiment will be applied comprises a reading means which includes a reading sensor 11 to read out data by following the data tracks in the data recording regions in the optical data recording medium (not shown), a buffer 41 which holds the read out data, a movement controller 90 which controls the relative movements of the reading sensor 11 and the optical data recording medium to cause the sensor 11 to follow the data tracks in the data recording regions, and a synchronizing signal generator 80 which sends synchronizing signals to the sensor 11 and to the movement controller 90 for controlling.

The reading sensor 11 is provided with photodetectors in the number two times the number of memory cells in one track, for instance 1024 elements in this embodiment, and arranged at an interval corresponding to that of the cells. The structure and the operation are essentially the same as those in the first embodiment.

The reading means 10 is provided with a binary coder 12 which encodes said video signals Vd into binary signals Bs. The binary signals Bs are stored at the buffer 41.

The movement controller 90 comprises a driving control circuit 91 which forms driving signals on the basis of synchronizing signals sent from the synchronizing signals generator 80, and a moving device 92 which relatively moves the reading sensor 11 and the optical recording medium in accordance with the driving signals.

The synchronizing signal generator 80 supplies the reading sensor 11 with synchronizing signals $\phi R$ as shift pulses for transferring electric charges accumulated at the photodetectors and synchronizing signals $\phi T$ for synchronizing the start of transfer in each track. It also outputs synchronizing signals to start moving the driving control circuit. The synchronizing signals $\phi R$ in this embodiment are outputted between the two synchronizing signals $\phi T$, $\phi T$ in 1024 pulses which correspond to the number of elements in the reading sensor 10.

The data reading device according to this embodiment is further provided with a reference line detecting means 50 which detects the reference lines from binary signals Bs outputted from the binary coder 12 and a tracking decision means 100 which decides whether the position of the reference lines detected by the reference line detecting means 50 is within the predetermined tolerance.

The reference line detecting means 50 comprises a signal level discriminator 51 which takes out signals of a predetermined output level corresponding to the reference lines from the binary signals Bs of the binary coder 12, a time duration counter 52 which counts the duration of the signals taken out at the circuit 51 and when the duration reaches the time corresponding to the width of the reference lines, outputs reference line detection signals, and a decision circuit 53. The reference line detecting means 50 differs in structure from that of the first embodiment. The same structure may of course be applicable.

Figure 16:
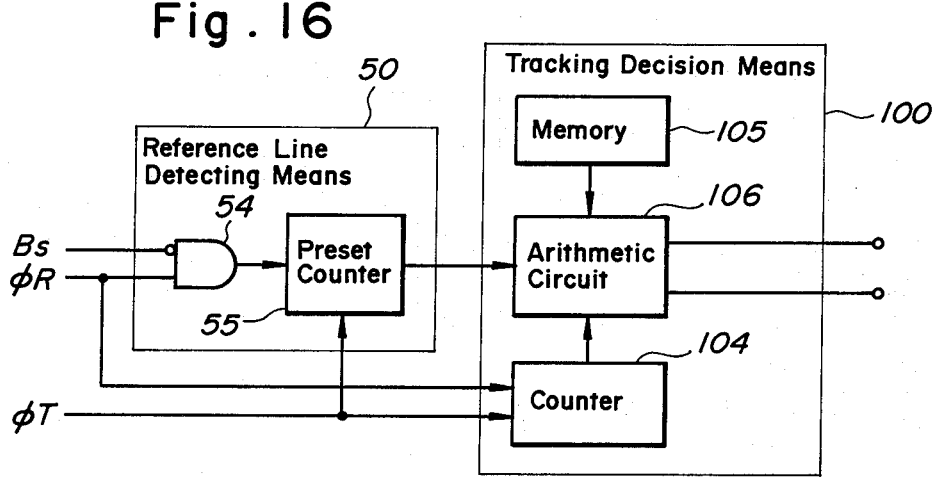
FIG. 16 is a block diagram to show the essential portion of said embodiment.

The signal level discriminator 51 may be an AND gate 54 as shown in FIG. 16, and receives said synchronizing signals $\phi R$ and the inverted binary signals Bs.

The time duration counter 52 and the decision circuit 53 may be a preset counter 55, for example, as shown in FIG. 16. The preset counter 55 counts the outputs from the AND gate 54 when they are in high level, and when the counted value reaches a preset value, outputs reference line detection signal pulses.

The preset value is given as the number of synchronizing signals $\phi R$ corresponding to the time lemgth necessary for the reading sensor 11 to read out the width of the reference lines. The value corresponds to 40 pulses in this embodiment and is substantially fixed. Although the counted value is reset by the synchronizing signal $\phi T$ every time the track changes, the preset value is not reset.

The tracking decision means 100 comprises a reading position detecting means 101 which detects the current reading position in correspondence with the serial scanning of the sensor 11 track by track, a tolerance setting means 102 which predetermines a tolerance as a reference value in which scope the presence of reference lines are permitted, and a comparator 103 which compares whether or not the reading position at the time when the reference line detection signal is outputted is within the tolerance As shown in FIG. 16, the reading position detecting means 101 may be a counter 104 which is reset by the synchronizing signal $\phi T$ each time the track changes, and counts the synchronizing signals $\phi R$ synchronously with the transfer of the read data from each track.

The tolerance setting means 102 may be a memory 105 as shown in FIG. 16 which sets the reference value for indicating the tolerance in the number of memory cells from the starting end of the tracks. In this embodiment, the reference value is such that the optical system including the reading sensor is placed at a standard position which enables the first reference line to terminate at the 256th $\phi R$ from the first $\phi T$. The tolerance is set at a value $\pm 8$ of the counted $\phi R$.

The comparator 103 comprises an arithmetic circuit 106 as shown in FIG. 16. The arithmetic circuit 106 is actuated with the output pulse from the preset counter 55, reads in the reference value data from the memory 105 as well as the current value from the counter 104 and compares the two. If the counted value is within the tolerance, the arithmetic circuit 106 outputs a normal status signal; Otherwise, a status signal indicating to that effect as well as a signal indicating the extent of a deviation are outputted to the movement controller 91.

(Operation of the Third Embodiment)

The operation of the third embodiment having the above structure will be described referring to FIGS. 16 through 19.

Figure 17:
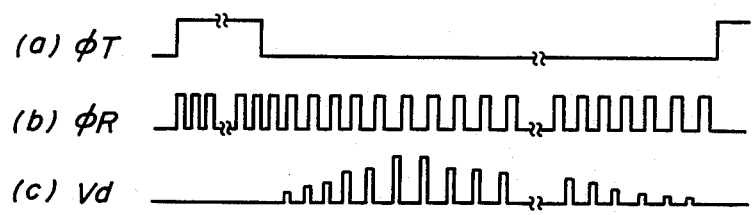
FIGS. 17(a)-(c) show waveforms to indicate the relation between synchronizing signals of the reading sensor and the output video signal thereof.

In reading out data from an optical recording medium, the movement controller causes the reading sensor 11 to oppose to tracks of the data recording region which should be read out. At this position, the synchronizing signals $\phi T$ as shown in FIG. 17 are sent from the synchronizing signal generator 80 to start the reading sensor 11. The reading sensor 11 serially transfers electric charges accumulated at the photodetectors with the synchronizing signals $\phi R$ (see FIG. 17b) and outputs video signals Vd as shown in FIG. 17c. The video signals are sent to the binary coder 12 to become binary signals.

Having completed reading one data track in this manner, the reading sensor 11 is moved to the next track by the movement controller and starts scanning anew.

In order to read the data accurately, the reading sensor 11 must be opposed in parallel to the data trains to be read, i.e. tracks. This means that the reading sensor must precisely follow the data trains. The third embodiment solves the problem in this respect.

The operation unique to this embodiment will now be described.

Figure 18:
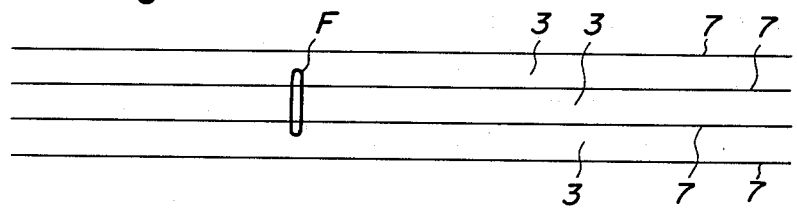
FIGS. 18 and 19 are explanatory views to show the relation between the field F of the reading sensor and data recording regions.

The reading sensor 11 moves along the data recording regions 3 on the optical recording medium 1, reading the data track by track. The sensing field F of the reading sensor 11 at one time is the width equivalent to ca. 2 data recording regions, as shown in FIG. 18. The standard operation requires that two reference lines 7 must always be included in the field F. Therefore, like the first embodiment, video signals Vd are outputted from the reading sensor 11 synchronously with the signals $\phi T$, $\phi R$.

The video signals are sent to the binary coder 12 as described above to become binary signals. They are stored at the buffer 41 and at the same time sent to the -reference line detecting means 50. The binary signals Bs are inverted and inputted at the AND gate 54 which constitutes the signal level discriminator 51. The synchronizing signals $\phi R$ are also inputted at the AND gate 54. As a result, the AND gate 54 outputs pulses which synchronize with the signals $\phi R$ when the binary signal Bs is at a low level. It is noted that for easier signal discrimination, data are FM encoded in advance as in the first embodiment.

These pulses are counted by the preset counter 55. As mentioned above, the preset counter 55 is set with a predetermined value in advance. When the counted value reaches the predetermined value, the counter outputs pulses. The counted values are reset when a synchronizing signals $\phi T$ is inputted.

At the tracking decision circuit 100, the counter 104 counts the synchronizing signals $\phi R$. The counting is reset each time a synchronizing signal $\phi T$ is inputted to start counting operation anew.

Figure 19:
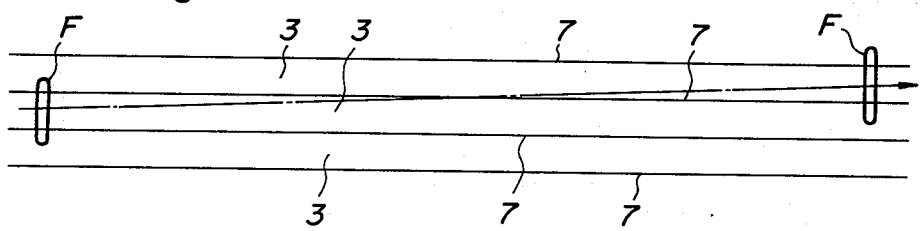

The pulses outputted from the preset counter 55 are inputted at the arithmetic circuit 106. Upon receiving the pulses, the arithmetic circuit 106 reads out the reference value $256 \pm 8$ in this embodiment) which has been previously inputted and which corresponds to the position of the reference line. At the same time, the circuit 106 reads in the counted values of the counter 104. The circuit 106 compares the reference value with the counted values for their difference and when the value is within the tolerance of the reference lines indicated by the reference value, outputs a status signal indicating to that effect. On the other hand, as shown in FIG. 19, if the values fall out of the tolerance, a status signal indicating a tracking error is outputted.

These status data are inputted at the buffer 41 and the driving control circuit 91 in this embodiment. The status signal inputted at the buffer 41 is used as a signal to decide whether or not the currently read out data is normal. At the driving control circuit 71, the moving device 92 moves the reading sensor 11 on the basis of the status data as well as the result obtained from the arithmetic circuit 106 to modify the position by moving the reading sensor 11 by the moving device 92.

Although the output signal of the decision circuit 100 is utilized to automatically modify the position of the reading sensor 11, it is also possible that a normal or abnormal status signals may be outputted.

(Structure and Operation of the Fourth Embodiment)

Figure 20:
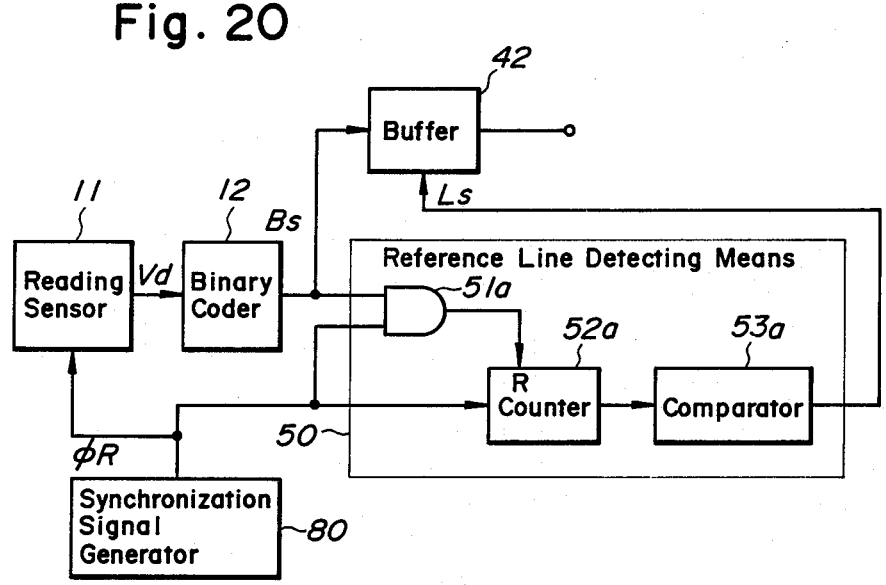
FIG. 20 is a block diagram of the structure to show the fourth embodiment of this invention.

The structure of the fourth embodiment according to the present invention will now be described referring to FIG. 20.

Figure 12:
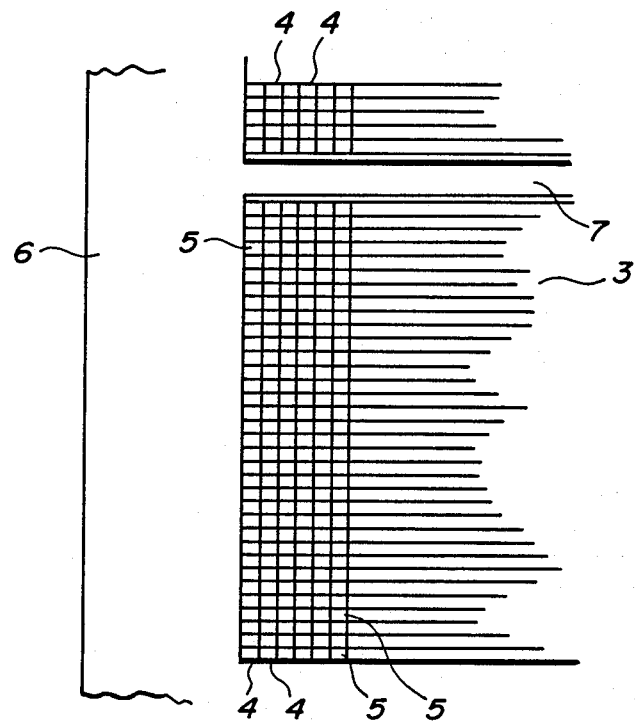
FIG. 12 is an enlarged plane view of the portion in FIG. 10 marked with the arrow A.

The optically recorded data reading device shown in the figure comprises as essential components a reading sensor 11 which reads the data following the tracks 4 on a data recording region 3 as shown in FIG. 12, a binary coder 12 which encodes the output video signals from the sensor 11 into binary signals, a buffer 42 which temporarily stores the binary signals Bs, a reference line detecting means 50 which detects the reference lines 7 from the binary signals Bs, and a synchronizing signal generator 80.

The components of the fourth embodiment except for the buffer 42 are identical in structure and operation to those of the first and the third embodiments. Therefore, only the different aspects will be explained.

The buffer 42 comprises input/output control gates and a register. It alternately opens/closes the control gates at the input and the output in accordance with the input of the reference line detection signal Ls (which will be described later), stored the binary signals Bs and outputs the previously stored binary signals Bs.

When the reference line detection signals Ls are outputted from the comparator 53a, the signals Ls are sent to the buffer 42. The buffer 42 opens the input gate with the first reference line detection signal Ls while closing the output gate therewith.

Subsequently, as the second reference line detection signal Ls reaches the buffer 42, the buffer 42 closes the input gate and opens the output gate.

As a result, the output from the reading sensor 10 which covers these two reference lines, the data of the track defined by these two lines, and data of a portion of the tracks outside these two lines are read to extract the data of the particular track which should be read. Thus, even if the field F of the sensor 11 is somewhat deviated vertically (in the direction of tracks), data can be accurately read out without minute and complicated positional correction.

It is also possible to detect the positional deviation and angular displacement of the sensor 11 from the time length from the start of video signal reading until the detection of the reference lines position.

(Modified Embodiments)

The present invention is not limited to the above embodiments but can be modified in structure.

For example, whereas the reading position indicating means of the first embodiment changes the target value to correct the deviation of the field, it is also possible to modify the counted value of the reference lines for correction. Although a gate circuit is provided separately in the first embodiment, the gate may be incorporated in the decoder, the reading position indicating means or the like.

In the first and the second embodiments, the length of the sensing field is determined to cover the length of four data recording regions, but it may cover five regions or more. In the embodiments described above, the first reference line appearing in the field is the target of monitoring. The target reference line may be the second or thereafter.

Although these embodiments refer to the detection of reference lines having identical width, the present invention is also applicable to the detection of reference lines having different widths.

Figure 21:
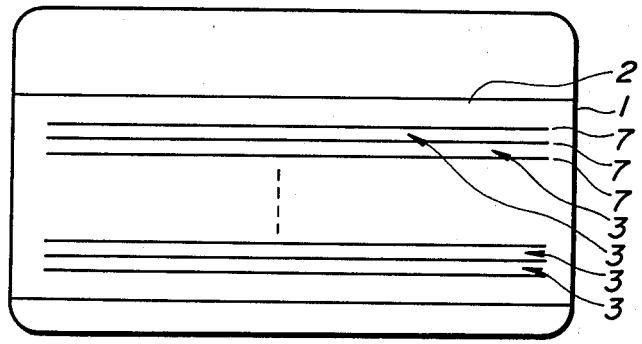
FIG. 21 is a plane view to show another embodiment of the optical recording medium from which data is read out in accordance with this invention.

The present invention is further applicable to optical recording medium such as shown in FIG. 21.

What is claimed is:

1. A method for reading out optically recorded data from an optical recording medium having data recording regions defined by reference lines in stripe form respectively and plural data tracks arranged perpendicular to said reference lines and in parallel to each other on said data recording regions, which is characterized in that:

data are sequentially read from a starting end of a sensing field of a reading sensor, said field covering plural data tracks including the data tracks to be read, signals optically corresponding to said reference lines are extracted from the output signals of said reading sensor to sequentially detect the reference lines, and when a reference line at a predetermined order in said field is detected, the data from the track in the data recording region defined by th detected reference line at said predetermined order is read in as the proper data, wherein the position of the first reference line in said sensing field is detected for temporary store and the position of a first reference line which will appear in said sensing field will be detected in a succeeding reading for comparison with the so temporarily stored position of the first reference line to monitor whether there is any drastic change between the two, if there is no drastic change and when the reference line at the predetermined order in the field is detected, the data from the track in the data recording region defined by said reference line at said predetermined order is read in as the proper data, and if there is a drastic change, and when a reference line which has been at the predetermined order in the field in the previous reading and now at an order adjacent said predetermined order in th field is detected, the data from the track in the data recording region defined by said reference line which is now at the order adjacent said predetermined order is read in as the proper data.

2. A device for reading out optically recorded data from an optical recording medium having data recording regions defined by reference lines in stripe form respectively and plural data tracks arranged perpendicular to said reference lines and in parallel to each other on said recording regions, comprising:

a reading means which sequentially reads out data from a starting end of a sensing field, said field covering plural data tracks including the data track to be read and reference lines defining these tracks, reference line detecting means which takes out from the output signal of the reading means a signal optically corresponding to the reference lines and outputs reference line detection signals, reading position indicating means which counts said reference line detection signals, and when reference lines at predetermined orders in the field are detected from the reference line detection signals, indicates the position of the data of the track on the data recording region defined by th reference line at a said predetermined order, a gate circuit which controls output of signals from said reading means, reading position modification indicating means which includes means for detecting the position of successive first reference lines, means for storing the position of each first reference line in the latest two readings by said reading means, means for comparing the first reference line position in the latest reading with the stored first reference line position in the second from the latest reading to monitor if there is a drastic change between the two, and means operative if there is a drastic change therebetween for directing the data reading position to be on a data recording region adjacent the order predetermined in said field, and reading position directing means which counts said reference line detection signals and if there is no such modification direction as above, when it detects the reference line on the predetermined order, outputs a gate signal to open said gate circuit while if there is such modification direction as above, when it detects the reference line adjacent the predetermined order in said field, outputs a gate signal to open the gate of said gate circuit.

3. The device for reading out optically recorded data as claimed in claim 2 which is characterized in that: said reference line detecting means comprising
a signal level discriminating means which takes out signals at a level optically corresponding to the reference line from the output signals of the reading sensor,
a time duration counter which counts the duration of the signals thus taken out, and
a decision means which compares whether the duration counted by the time duration counter reaches the preset reference value, and if it does, outputs reference line detection signals.

4. The device for reading out optically recorded data as claimed in claim 2 wherein said reference a detecting means comprises,
a signal level discriminating means which takes out signals at a level optically corresponding to the reference lines out of the output signals of the reading sensor,
a time duration counter which counts the duration of the signals thus taken out, and
a decision means which compares whether the time counted by the time duration counter reaches a preset value or not and if it does, then outputs reference line detection signals.

5. The device for reading out optically recorded data as claimed in claim 3 wherein said reading position indicating means comprises:
a reference line counter which counts the reference lines by counting the reference line detection signals to detect the reference lines defining the data recording region to be read, and
a reading position decision circuit which compares the counted value of a reference line counter with the preset target value to decide the position of the data recording region to be read.

6. The device for reading out optically recorded data as claimed in claim 2 wherein said reading position modification means comprises:
a target reference line detector which detects the first reference line coming into the sensing field,
a reading position detector which detects the position of the data in the field the reading sensor is currently reading, and
a shift indicator which compares the position in the field of the first reference line detected by said target reference line detector with the position detected in a preceding reading to monitor if there is any drastic change therebetween and if so, outputs a shift indicating signal for shifting the reading position in accordance with the direction of the change.

7. The device for reading out optically recorded data as claimed in claim 6 wherein said reading position indicating means comprises:
a reference line counter which counts the reference lines by counting the reference line detection signals to detect the reference lines defining the data recording region to be read, and
a reading position decision circuit which determines the position of data recording regions from which data should be read from the counted value of said reference line counter and said shift indicating signals.

8. The device for reading out optically recorded data as claimed in claim 4 wherein said reading position modification means comprises:
a target reference line detector which detects the first reference line coming into said sensing field,
a reading position detector which detects the position of the data in the field the reading sensor is currently reading, and
a shift indicator which compares the reading position of the first reference line in the field detected by the target reference line detector with the position detected in a preceding reading to monitor if there is any drastic change, and if so, outputs a shift indicating signal for shifting the reading position in accordance with the direction of the change.

9. The device for reading out optically recorded data as claimed in claim 8 wherein said reading position indicating means comprises:
a reference line counter which counts the reference lines by counting the reference line detection signals to detect the reference lines which define the data recording region to be read, and
a reading position decision circuit which compares the counted value of said reference line counter with, a preset target value to decide the position of the data recording region to be read.

10. A device for reading out optically recorded data from an optical recording medium having data recording regions defined by reference lines in the stripe form respectively and plural data tracks arranged perpendicular to said reference lines and in parallel to each other on said recording regions comprising:
reading means which sequentially reads out data from a starting end of a sensing field, said field covering plural data tracks including the data track to be read and reference lines defining these tracks, reference line detecting means which takes out from the output signal of the reading means a signal optically corresponding to the reference lines and outputs reference line detection signals, reading position indicating means which counts said reference line detection signals, and when reference lines at predetermined orders in the field are detected from the reference line detection signals, indicates the position of the data of the track on the data recording region defined by th reference line at a said predetermined order, wherein said reading position indicating means comprises:

a reference line counter which counts the reference lines by counting the reference line detection signals to detect the reference lines defining the data recording region to be read, and a reading position decision circuit which compares the counted value from the reference line counter with a preset target value to decide the position of the data recording region to be read.

* * * * *